United States Patent [19]

Pan

[11] 4,109,315
[45] Aug. 22, 1978

[54] WRISTWATCH CALCULATOR WITH SELECTIVELY SCANNED KEYBOARD

[75] Inventor: Michael Pan, San Jose, Calif.

[73] Assignee: Hewlett-Packard Company, Palo Alto, Calif.

[21] Appl. No.: 718,741

[22] Filed: Aug. 30, 1976

[51] Int. Cl.² .................. G06F 7/38; G06F 15/02; G04B 19/30
[52] U.S. Cl. ..................... 364/705; 58/50 R; 58/152 R; 364/707; 364/709
[58] Field of Search ............ 235/152, 156, 145 R; 340/365 R, 365 E; 58/50 R, 152 R

[56] References Cited

U.S. PATENT DOCUMENTS 3,941,989  3/1976  McLaughlin et al. ............ 235/156
3,955,355  5/1976  Luce .............................. 235/156 X

*Primary Examiner*—Jerry Smith
*Attorney, Agent, or Firm*—Patrick J. Barrett

[57] ABSTRACT

A wristwatch calculator is provided with a keyboard for the entry of information into and control of operations of the apparatus. The keyboard comprises an array of switches connected in an X-Y matrix that is scanned by row and column to find and identify a key that has been depressed. The scanner is operated only when calculator circuitry in the apparatus is in a sleep or inactive mode in order to save battery power.

1 Claim, 8 Drawing Figures

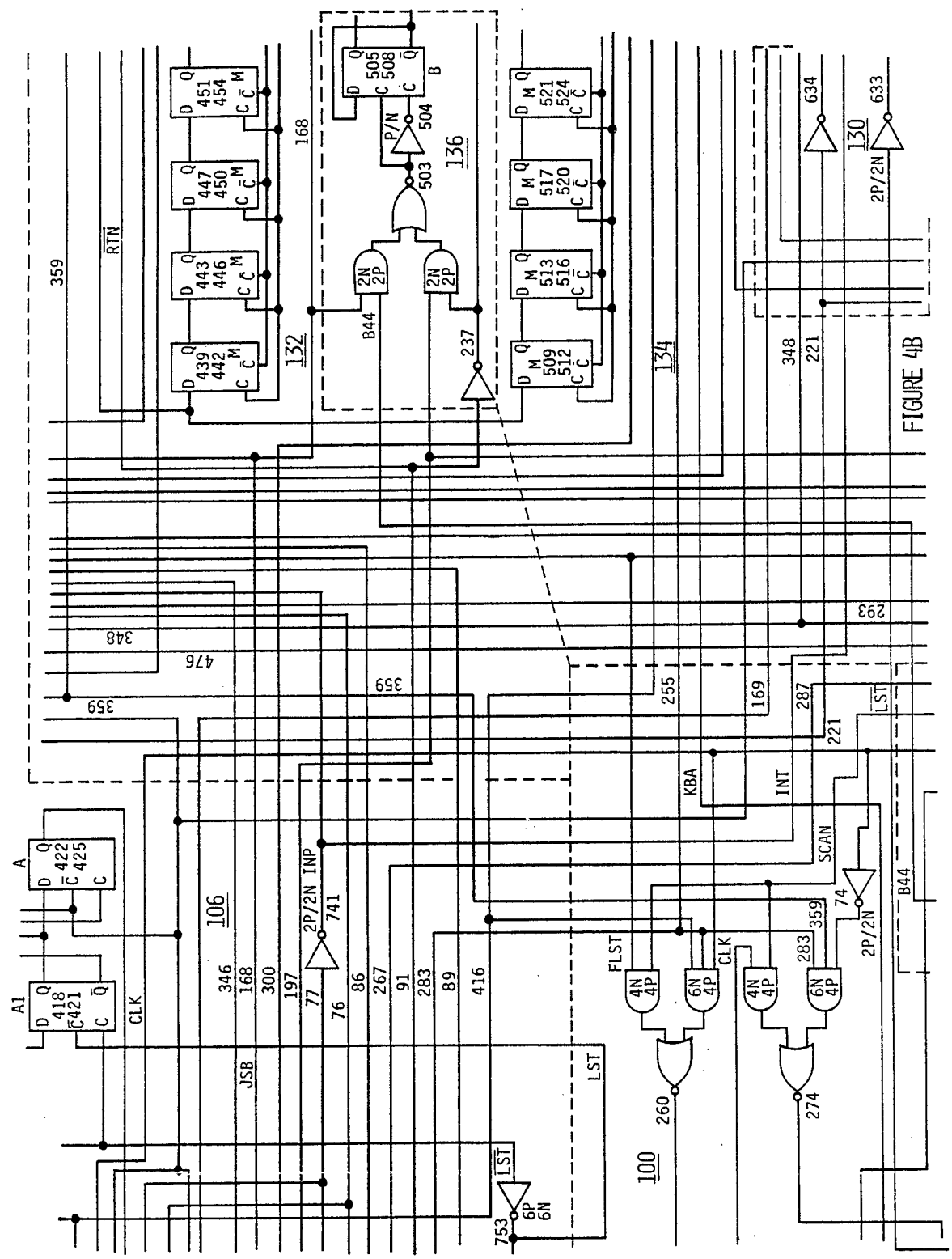

WRISTWATCH CALCULATOR WITH SELECTIVELY SCANNED KEYBOARD

BACKGROUND AND SUMMARY OF THE INVENTION

Keyboards in most prior art calculators include an array of switches for entering information into the calculator. In order to conserve the number of connections necessary between the keyboard and the calculator circuitry, the key switches are arranged in an X-Y matrix and the rows and columns of this matrix are electronically scanned to detect and identify a depressed key. In many calculators using this method the keyboard scanning goes on continuously except for a short interruption while a key is still depressed after it has been detected and identified. This allows the calculator to be constantly ready for the input of new information but it also consumes extra battery power to have the keyboard scanner circuitry operating at the same time other portions of the calculator circuitry, such as the central processor, are operating.

In the preferred embodiment of the present invention, a keyboard is provided for an interactive wristwatch calculator and the key switches are arranged in an X-Y matrix. The rows and columns of this matrix are scanned in order to detect and identify a switch closure but the scanning is inhibited during the time the calculator circuitry is active. When the calculator circuitry has finished with the procedure, such as entering a number or making a calculation, the circuitry goes into an inactive mode at a significantly reduced level of power consumption and only then is the keyboard scanned.

BRIEF DESCRIPTION OF THE DRAWINGS

FIGS. 4A, 4B, 4C and 4D show detailed schematic diagrams of circuitry for the preferred embodiment of the present invention.

DESCRIPTION OF THE PREFERRED EMBODIMENT

U.S. Patent Application Ser. No. 656,751 entitled "Interactive Wristwatch Calculator" filed Feb. 9, 1976 by Edward A. Heinsen, Andre F. Marion, and Thomas E. Osborne, is hereby incorporated by reference in its entirety. For a detailed description of the invention claimed herein the "Control and Timing Circuit" section of the referenced patent application is reproduced below, along with FIGS. 5J, 5K, 5N and 5P of the referenced patent application, which are FIGS. 4A, 4B, 4C and 4D, respectively, herein. The "Control and Timing Circuit" section of the referenced patent application describes the operation of the control and timing circuit which includes circuitry to control the operation of the calculator circuitry as well as the keyboard scanner.

Figure 1:
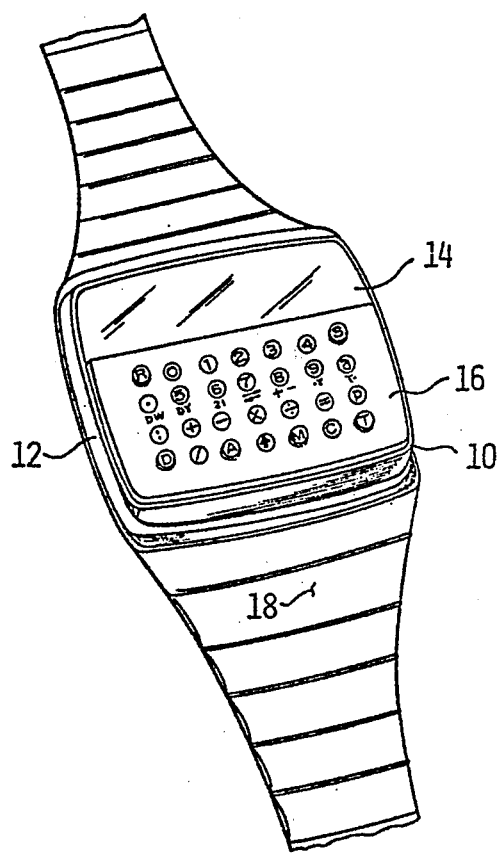
FIG. 1 is a pictorial representation of the watch calculator.
Figure 2:
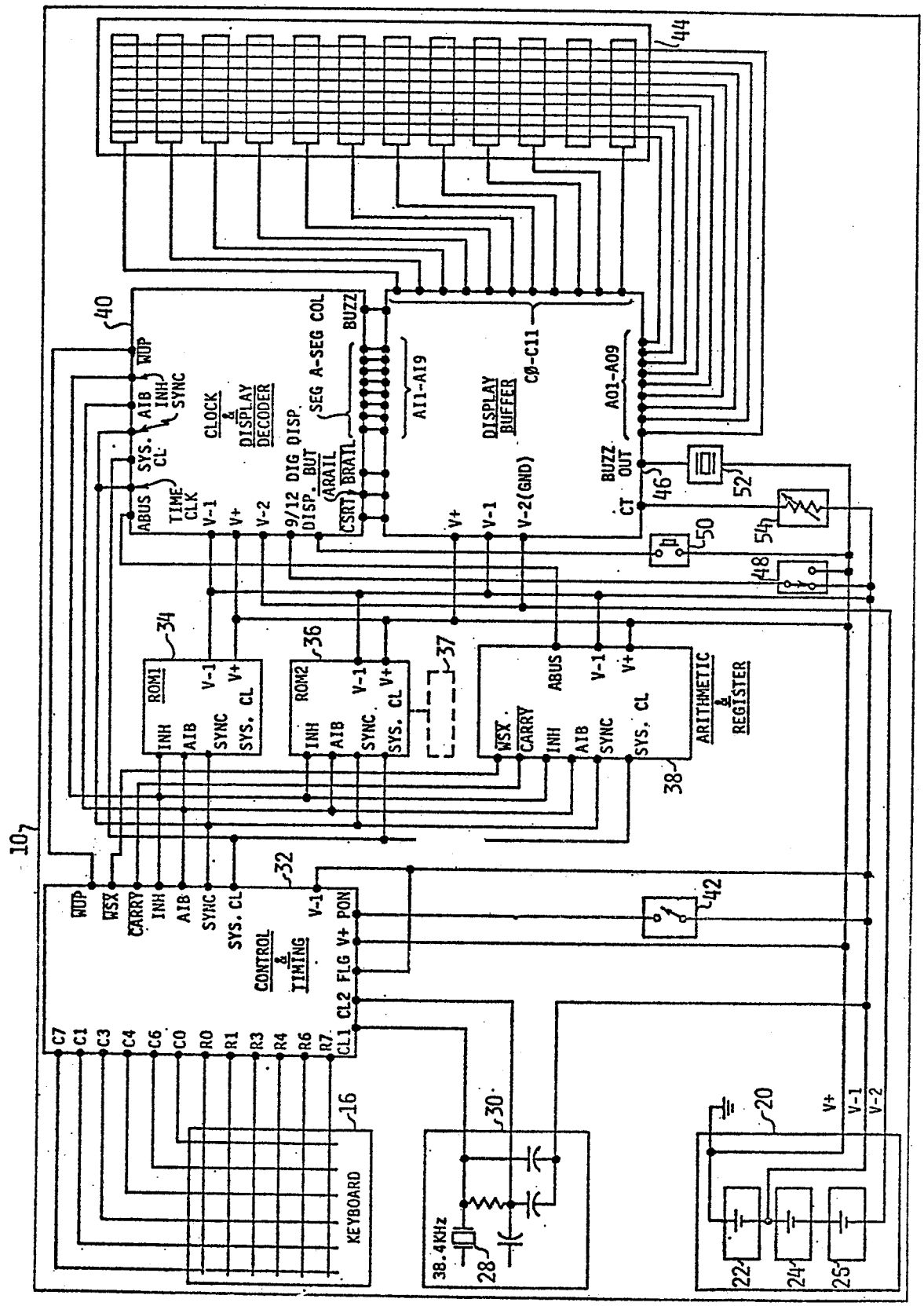
FIG. 2 is a block diagram of the preferred embodiment of the present invention.
Figure 3A:
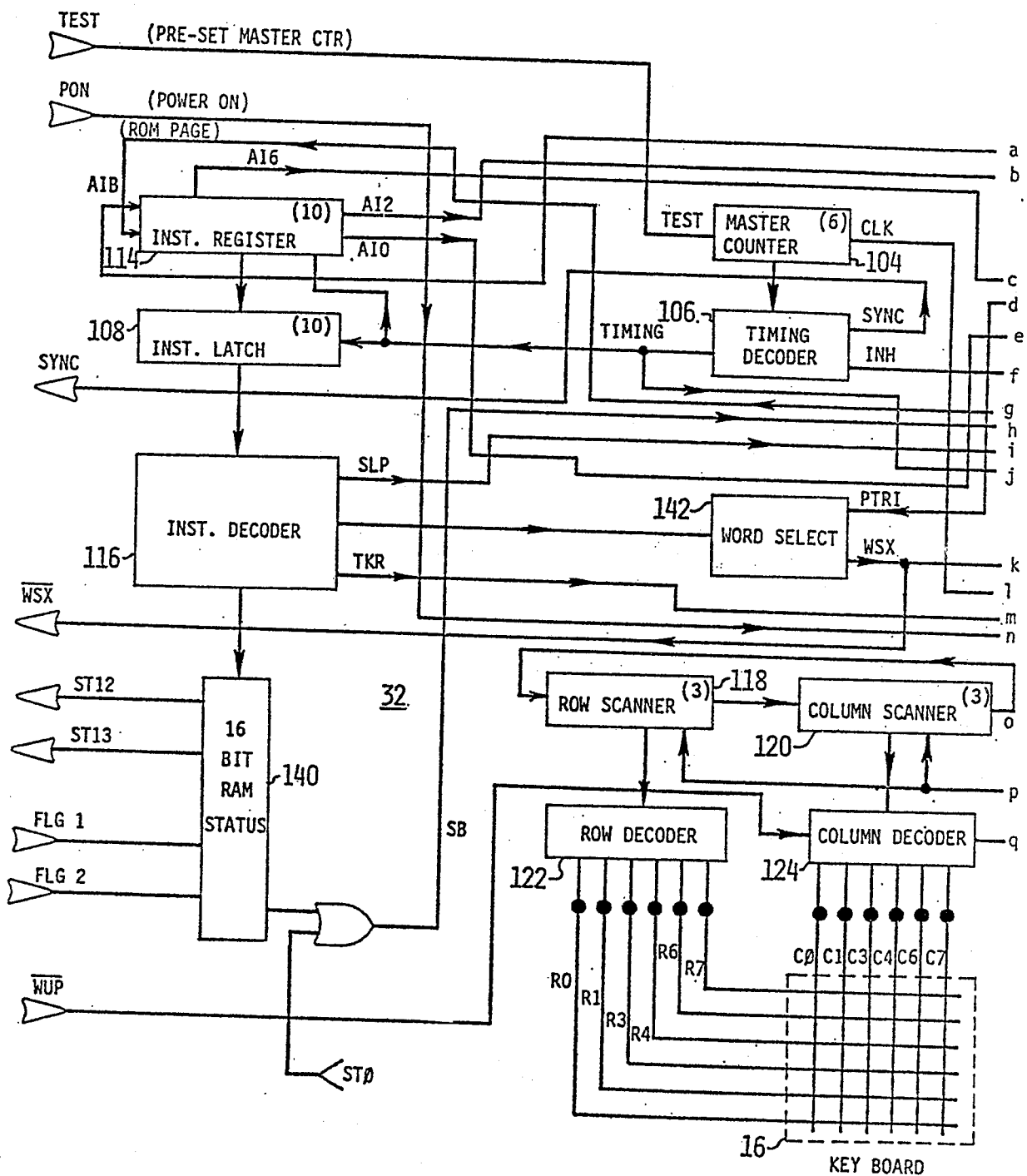
FIGS. 3A and 3B show a block diagram of a control and timing circuit used in FIG. 2.
Figure 3B:
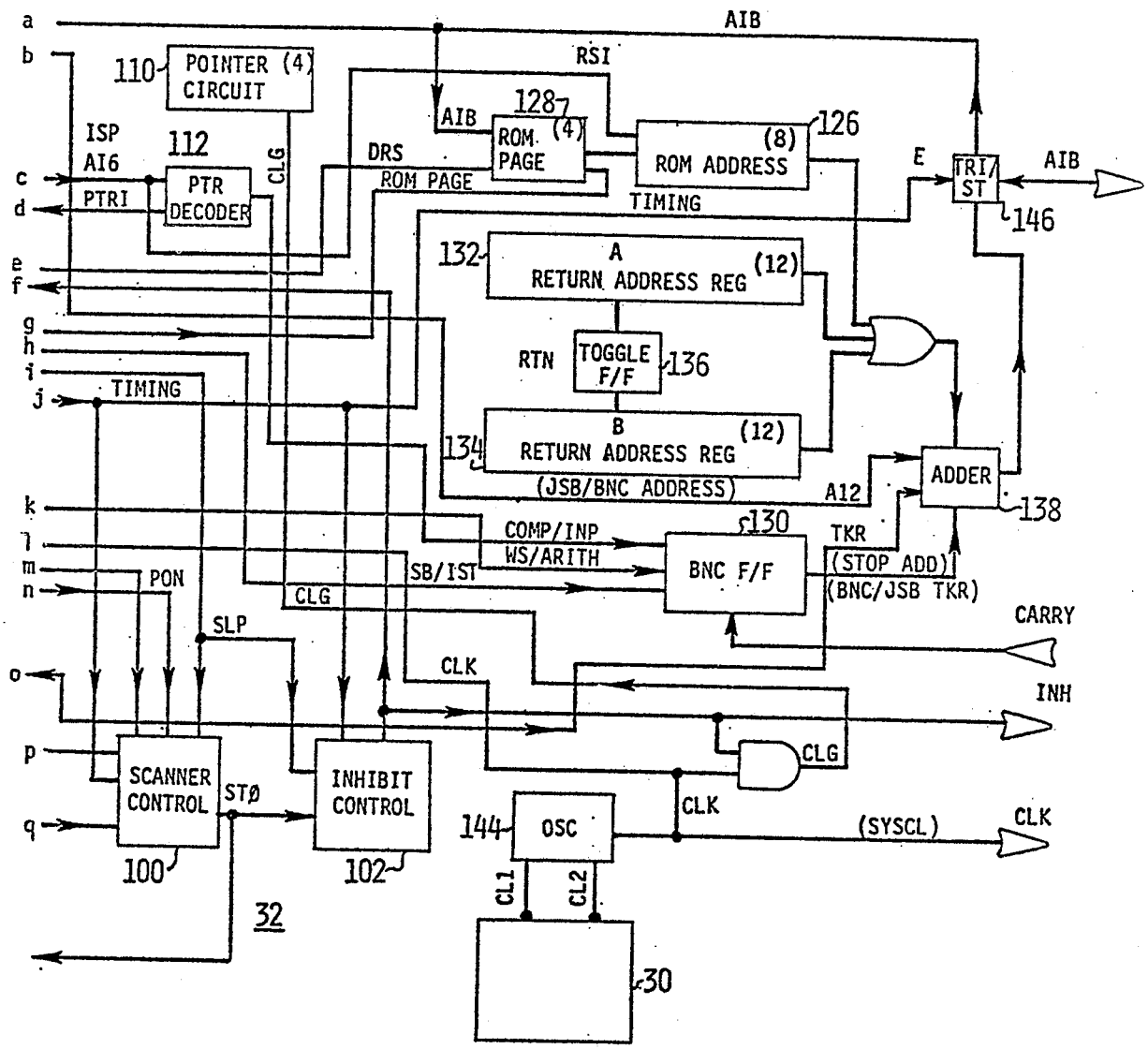
Figure 4A:
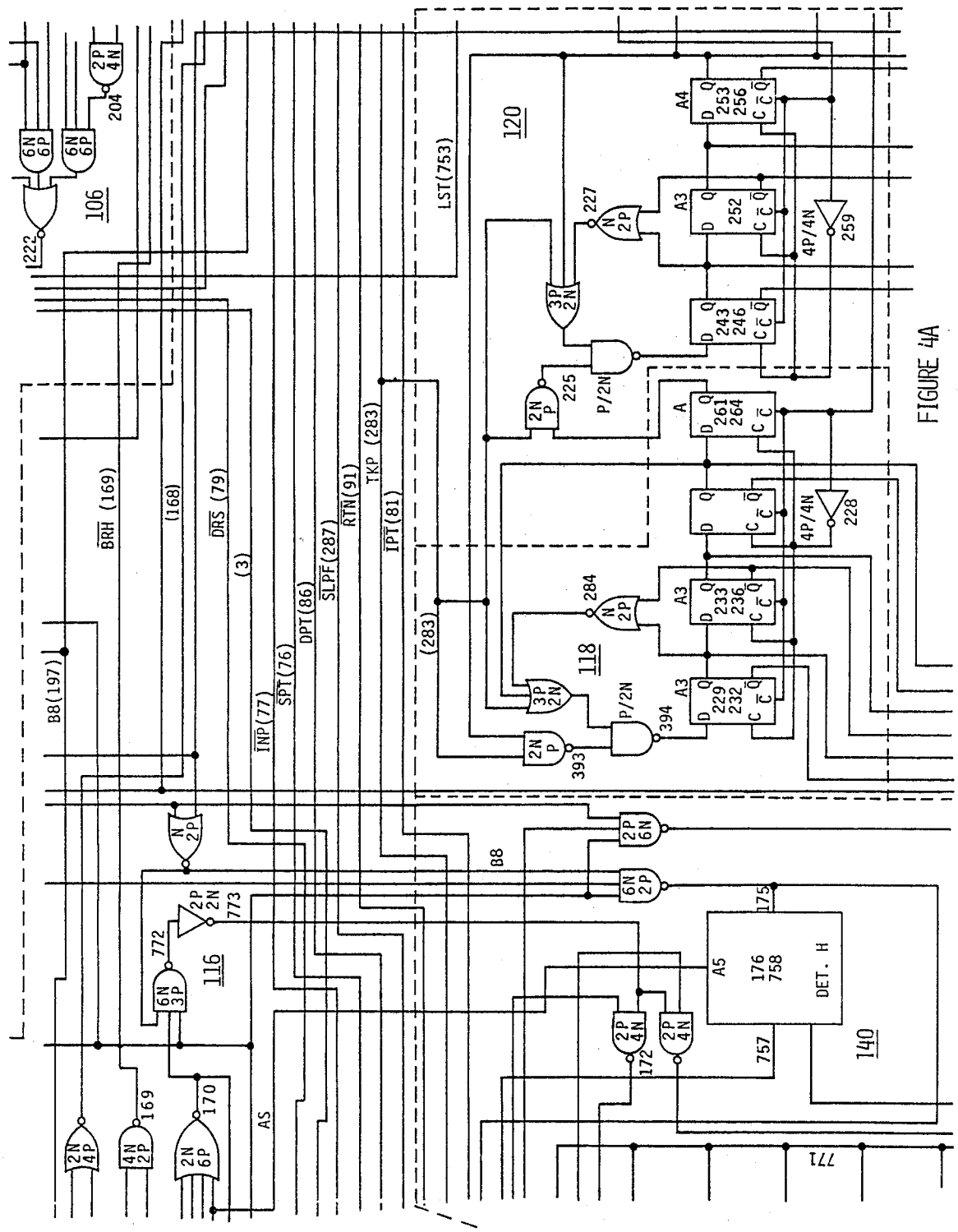
Figure 4C:
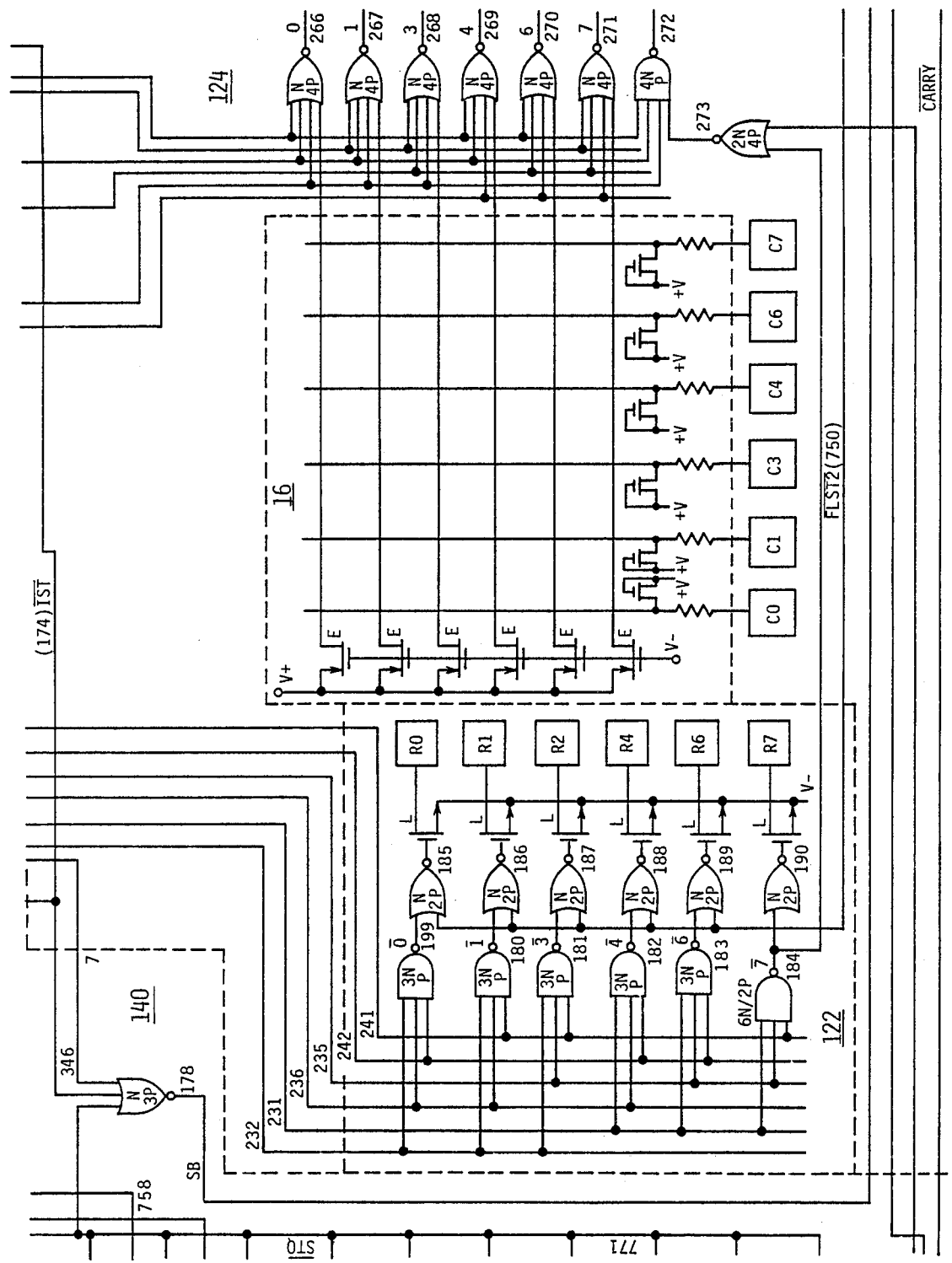
Figure 4D:
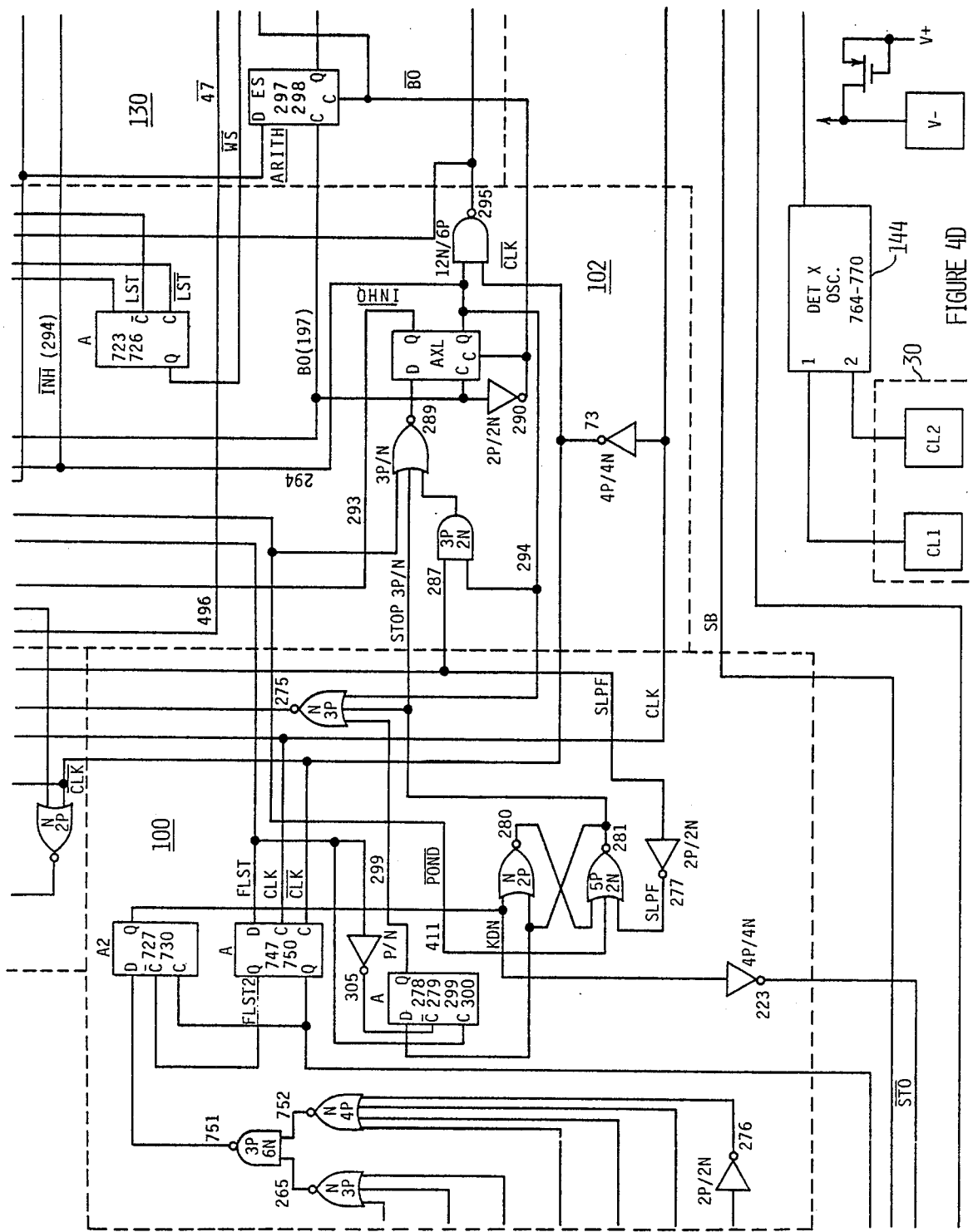

FIGS. 3A and 3B herein show a block diagram of the Control and Control and Timing Circuit (C&T chip) and more detailed schematic diagrams are shown in FIGS. 5A through 5V of the referenced patent application and FIGS. 4A through 4D herein.

There is a switch 42 in the watch/calculator case which must be activated to reset the watch/calculator after power is applied when battery 22 is replaced. The switch is connected to the PON input to C&T chip 32 to give a power-on signal for initializing the watch/calculator circuitry. The PON input is connected to a scanner control 100 which controls the keyboard scanner. The power-on signal will stop the keyboard scanner and at the same time it will release an inhibit control 102 to make the total system active. This control signal appears on the line labeled INH. When the signal on INH is low, the system is idle. When the signal is high, it causes the watch/calculator circuits to be active.

However, during the time switch 42 is closed, there are certain portions of the circuitry that are still not active. A few circuits are active, such as a master counter 104 and a timing decoder 106 which produce a synchronizing signal on the SYNC line connected to all of the chips. Because the switch 42 is closed, an instruction latch 108 prevents any instructions received from the ROM from being acted upon. At the same time a pointer counter 110 and pointer decoder 112 are maintained inactive.

During the time switch 42 is closed, the C&T chip sends out a "zero" starting ROM address continually. As soon as switch 42 is released the starting address sent to ROM will, initially, still be all zeroes. The C&T chip will now be enabled to respond to information sent back from the ROM in response to this starting address. Once the circuits are in the active mode, the following sequence of events occurs. During the time defined by a pulse on the SYNC line, the C&T chip receives a ROM instruction on the AIB line in an instruction register 114. In response to timing decoder 106 this instruction is parallel loaded into the instruction latch. The information in the instruction latch is sent in parallel into an instruction decoder 116 which decodes the instruction. Then the instruction decoder gates the instruction with the proper signal from the timing decoder and sends it to the particular circuit that will perform the instruction. The instruction is only acted upon when validated by the timing decoder, as explained in greater detail below.

When the total system is active, the scanner control is not active, and therefore the keyboard is not being scanned. So at the end of a power-on subroutine which starts at address "zero" in the ROM, the ROM will issue a sleep instruction and upon receiving the sleep instruction most of the circuits will become inactive or asleep. However, during the sleep period the keyboard scanner comprising a row scanner 118, a column scanner 120, a row decoder 122 and a column decoder 124 will become active and will scan the keyboard until a key is depressed. As soon as the keyboard scanner detects a key depression, it will stop and wake up the rest of the system, by making the signal on the line INH become high. Row and column information from the row and column scanners represents the code of the depressed key.

The ROM is addressed during a portion of the timing cycle of the system called AT (Address Time). A ROM address comprises an 8-bit address and a 4-bit page number for a total of 12 bits. The page number tells which ROM chip the information is on and the address tells where on the chip. The address consists of 6 bits from the row and column scanners and two zero bits; the page number is from the ROM page register.

The keyboard scanner and the sleep mode of the watch/ calculator combine to provide 2 key rollover for the keyboard. When the system is in the sleep mode, the keyboard scanner will stop scanning when it detects a depressed key and any further key depressions, while the first key is depressed, will have no effect on the system. When the first key is released, operations will be performed in response to it and the calculator will go to sleep. Then the keyboard scanner will start scanning again and pick up the next key depressed, repeating the process.

I claim:

1. A watch calculator comprising:

a keyboard having key switches arranged in a matrix having rows and columns of key switches;

keyboard scanner means connected to the keyboard including row and column scanning circuits for scanning the rows and columns of key switches to detect and locate a closed key switch;

calculator circuit means coupled to the keyboard scanner means for accepting and performing arithmetic operations on numerical entries from the keyboard;

display means connected to the calculator circuit means for displaying numerical data;

watch circuit means connected to the display means for storing and periodically updating data representing time; and mode control means coupled to the calculator circuit means and the keyboard scanner means for placing the calculator circuit means in an active mode upon the actuation of one of a predetermined number of key switches in the keyboard and placing the calculator circuit means in an inactive mode in response to the completion of an arithmetic operation by the calculator circuit means, and for producing a signal to inhibit the keyboard scanner means when the calculator circuit means is in the active mode.

* * * * *